(12) United States Patent
Schluter

(10) Patent No.: US 12,297,651 B2
(45) Date of Patent: May 13, 2025

(54) UNCOUPLING MAT WITH HEATING ELEMENTS

(71) Applicant: Schluter Systems L.P., Plattsburgh, NY (US)

(72) Inventor: Werner Schluter, Iserlohn (DE)

(73) Assignee: Schluter Systems L.P., Plattsburgh, NY (US)

( * ) Notice: Subject to any disclaimer, the term of this patent is extended or adjusted under 35 U.S.C. 154(b) by 209 days.

(21) Appl. No.: 18/149,953

(22) Filed: Jan. 4, 2023

(65) Prior Publication Data

US 2023/0152549 A1     May 18, 2023

Related U.S. Application Data

(63) Continuation of application No. 17/538,984, filed on Jan. 25, 2022, now Pat. No. 12,044,016, which is a
(Continued)

(30) Foreign Application Priority Data

Mar. 9, 2017 (DE) ............. 20 2017 101 349.9

(51) Int. Cl.
*E04F 15/18*     (2006.01)
*E04C 2/20*     (2006.01)
(Continued)

(52) U.S. Cl.
CPC ............. *E04F 15/185* (2013.01); *E04C 2/20* (2013.01); *E04C 2/32* (2013.01); *E04F 15/182* (2013.01);
(Continued)

(58) Field of Classification Search
CPC ..... E04F 15/185; E04F 15/182; E04F 15/186; E04F 15/18; E04C 2/20; E04C 2/32;
(Continued)

(56) References Cited

U.S. PATENT DOCUMENTS 2,737,693 A    3/1956   Robbins
2,956,785 A    10/1960   Richl
(Continued)

FOREIGN PATENT DOCUMENTS

AU      6434901 A    12/2001
CA      2087055 A1    7/1994
(Continued)

OTHER PUBLICATIONS

Exhibit B-1 "To Progress Profiles SP A's and Progress Profiles America's Response to Schluter Systems L.P's First Set ofInterrogatories," pursuant to *Imre Baton and Progress Profiles SPA* vs. *Schluter Systems L.P.*, Civil Action No. 1:15-cv-00144-CMH-IDD, presented Aug. 31, 2015, 8 pages.
(Continued)

*Primary Examiner* — James C. Jones
(74) *Attorney, Agent, or Firm* — Thorpe North & Western; Jason R. Jones

(57) ABSTRACT

An uncoupling mat includes a flexible plastic layer (2) made of plastic film with structuring that defines indentations (6) provided with undercuts (5) on a first, top side (4) and cavities (8) positioned between the indentations (6) on an opposite second, bottom side (7). A fleece or fabric (3) is securely connected to the bottom side (7) and covers the cavities (8). A cross-section of the indentations (6) in at least some corner regions (10) increases from the bottom side (7) toward the top side (4).

9 Claims, 4 Drawing Sheets

Related U.S. Application Data continuation of application No. 17/411,123, filed on Aug. 25, 2021, now abandoned, which is a continuation of application No. 16/534,462, filed on Aug. 7, 2019, now abandoned, which is a continuation of application No. 15/914,223, filed on Mar. 7, 2018, now Pat. No. 10,900,241.

(51) Int. Cl.
| | | |
|---|---|---|
| *E04C 2/32* | (2006.01) | |
| *E04G 23/00* | (2006.01) | |
| *F24D 3/14* | (2006.01) | |
| *G02B 7/00* | (2021.01) | |
| *E04C 2/26* | (2006.01) | |

(52) U.S. Cl.
CPC .......... *E04F 15/186* (2013.01); *E04G 23/006* (2013.01); *F24D 3/146* (2013.01); *G02B 7/003* (2013.01); *E04C 2/26* (2013.01); *E04F 15/18* (2013.01)

(58) Field of Classification Search
CPC ......... E04C 2/26; E04G 23/006; F24D 3/146; F24D 3/142; G02B 7/003
See application file for complete search history.

(56) References Cited

U.S. PATENT DOCUMENTS

| | | | |
|---|---|---|---|
| 3,337,167 | A | 8/1967 | Johnson |
| 3,434,401 | A | 3/1969 | Kiewit |
| 3,597,891 | A | 8/1971 | Martin |
| 3,624,978 | A | 12/1971 | Skinner |
| 3,687,771 | A | 8/1972 | Meier |
| 3,888,087 | A | 6/1975 | Bergsland |
| 3,892,902 | A | 7/1975 | Ilukowicz |
| 4,016,692 | A | 4/1977 | Jordan et al. |
| D263,628 | S | 3/1982 | Planter |
| 4,318,258 | A | 3/1982 | Heck |
| 4,574,541 | A | 3/1986 | Raidt et al. |
| 4,576,221 | A | 3/1986 | Fennesz |
| 4,640,067 | A | 2/1987 | Hagemann et al. |
| 4,640,854 | A | 2/1987 | Radtke |
| 4,709,519 | A * | 12/1987 | Liefer ................... B65D 88/72 52/480 |
| 4,840,515 | A | 6/1989 | Freese |
| 4,868,399 | A | 9/1989 | Sephton |
| 4,879,857 | A | 11/1989 | Peterson |
| 4,905,437 | A | 3/1990 | Heather |
| 4,917,933 | A | 4/1990 | Schluter |
| 4,923,733 | A | 5/1990 | Herbst |
| 5,042,569 | A | 8/1991 | Siegmund |
| 5,052,161 | A | 10/1991 | Whitacre |
| 5,082,712 | A | 1/1992 | Starp |
| 5,105,595 | A | 4/1992 | Tokei |
| 5,256,007 | A | 10/1993 | Allen |
| 5,333,432 | A | 8/1994 | Schluter |
| 5,374,466 | A | 12/1994 | Bleasdale |
| 5,383,314 | A | 1/1995 | Rothberg |
| 5,386,670 | A | 2/1995 | Takeda |
| 5,412,917 | A | 5/1995 | Shelton |
| 5,480,259 | A | 1/1996 | Thrower |
| 5,489,462 | A | 2/1996 | Sieber |
| 5,499,476 | A | 3/1996 | Adams |
| 5,566,522 | A | 10/1996 | Alander et al. |
| RE35,369 | E | 11/1996 | Ducroux |
| 5,619,832 | A | 4/1997 | Myrvold |
| 5,743,330 | A | 4/1998 | Bilotta et al. |
| 5,868,399 | A | 2/1999 | Schluter |
| 6,094,878 | A | 8/2000 | Schluter |
| 6,161,353 | A | 12/2000 | Negola |
| 6,434,901 | B1 * | 8/2002 | Schluter ................ E04F 15/182 52/302.1 |
| 6,539,681 | B1 | 4/2003 | Siegmund |
| 6,672,016 | B2 | 1/2004 | Janesky |
| 6,691,472 | B2 | 2/2004 | Hubert |
| 6,786,013 | B2 | 9/2004 | Coulton |
| 6,802,668 | B2 | 10/2004 | Parker |
| 6,805,298 | B1 | 10/2004 | Corbett |
| 6,918,215 | B2 | 7/2005 | Smith |
| 7,014,390 | B1 | 3/2006 | Morris |
| 7,108,454 | B2 | 9/2006 | Blackwood |
| 7,121,053 | B2 | 10/2006 | Toncelli et al. |
| 7,250,570 | B1 | 7/2007 | Morand et al. |
| D555,814 | S | 11/2007 | Yin |
| 7,493,738 | B2 | 2/2009 | Bui |
| 7,536,835 | B2 | 5/2009 | Schluter |
| 7,585,556 | B2 | 9/2009 | Julton |
| 7,624,551 | B2 | 12/2009 | Thronicke |
| 7,735,280 | B2 | 6/2010 | Valentine |
| 8,176,694 | B2 | 5/2012 | Batori |
| 8,288,689 | B1 | 10/2012 | Adelman |
| 8,488,689 | B2 | 7/2013 | Liu |
| D706,459 | S | 6/2014 | Schluter |
| 8,888,067 | B1 | 11/2014 | Calmes |
| 8,950,141 | B2 | 2/2015 | Schluter |
| 8,955,278 | B1 * | 2/2015 | Mills ................. E04F 15/02038 52/302.3 |
| 9,188,348 | B2 | 11/2015 | Larson |
| 9,328,520 | B1 | 5/2016 | Kriser |
| 9,428,920 | B2 | 8/2016 | Schluter |
| 9,797,146 | B2 | 10/2017 | Schluter |
| 10,220,736 | B2 | 3/2019 | Cormier |
| D857,244 | S | 8/2019 | Faotto et al. |
| D857,933 | S | 8/2019 | Julton et al. |
| 10,392,814 | B2 | 8/2019 | Schluter |
| 10,788,091 | B2 | 9/2020 | Audi |
| 10,900,241 | B2 * | 1/2021 | Schluter ................ E04G 23/006 |
| 10,928,075 | B1 | 2/2021 | Warneke et al. |
| 10,968,641 | B2 | 4/2021 | Gutiahr |
| 10,975,582 | B2 | 4/2021 | Kaiser |
| 2001/0017015 | A1 | 8/2001 | Schulter |
| 2004/0074631 | A1 | 4/2004 | Jeon |
| 2005/0229520 | A1 | 10/2005 | Julton |
| 2006/0260233 | A1 | 11/2006 | Schluter |
| 2008/0017725 | A1 | 1/2008 | Backman, Jr. |
| 2008/0083833 | A1 | 4/2008 | Blanke |
| 2008/0236097 | A1 | 10/2008 | Tinianov |
| 2008/0276557 | A1 | 11/2008 | Rapaz |
| 2008/0290503 | A1 | 11/2008 | Karavankis |
| 2008/0290504 | A1 | 11/2008 | Karavakis |
| 2008/0295441 | A1 | 12/2008 | Carolan |
| 2009/0026192 | A1 | 1/2009 | Fuhrman |
| 2009/0217605 | A1 | 9/2009 | Batori |
| 2009/0230113 | A1 | 9/2009 | Batori |
| 2010/0251641 | A1 | 10/2010 | Gallagher |
| 2010/0319286 | A1 | 12/2010 | Becker |
| 2011/0047907 | A1 | 3/2011 | Smolka |
| 2014/0069039 | A1 | 3/2014 | Schlueter et al. |
| 2015/0167321 | A1 | 6/2015 | Schluter |
| 2016/0010327 | A1 | 1/2016 | Larson |
| 2016/0033144 | A1 | 2/2016 | Larson |
| 2016/0369517 | A1 | 12/2016 | Schluter |

FOREIGN PATENT DOCUMENTS

| | | |
|---|---|---|
| CA | 2317985 A1 | 3/2001 |
| CA | 2420097 A1 | 8/2003 |
| CA | 2456682 A1 | 8/2005 |
| CA | 2518285 | 3/2006 |
| CA | 2533062 A1 | 7/2007 |
| DE | 2650160 A1 | 5/1978 |
| DE | 2604782 C3 | 1/1979 |
| DE | 2840149 A1 | 3/1980 |
| DE | 3317131 A1 | 11/1984 |
| DE | 8633484 U1 | 7/1987 |
| DE | 3730144 A1 | 4/1988 |
| DE | 8812199 U1 | 1/1990 |
| DE | 3910629 A1 | 10/1990 |
| DE | 3916302 A1 | 11/1990 |
| DE | 9114591 U1 | 3/1993 |
| DE | 4238943 A1 | 1/1994 |
| DE | 4318258 A1 | 12/1994 |

(56) References Cited

FOREIGN PATENT DOCUMENTS

| | | |
|---|---|---|
| DE | 1986165 U | 5/1998 |
| DE | 3701414 A1 | 7/1998 |
| DE | 19750277 A1 | 5/1999 |
| DE | 29924180 U1 | 5/2002 |
| DE | 202006013453 U1 | 11/2006 |
| DE | 102006004755 B4 | 4/2008 |
| DE | 202011/110801 U1 | 6/2016 |
| EP | 0371268 B1 | 2/1993 |
| EP | 0561538 A1 | 9/1993 |
| EP | 0806613 | 11/1997 |
| EP | 1054217 A2 | 11/2000 |
| EP | 1063478 A2 | 12/2000 |
| EP | 1068413 B1 | 1/2001 |
| EP | 1073813 B2 | 2/2001 |
| EP | 1460345 A1 | 9/2004 |
| EP | 1712695 B1 | 5/2013 |
| EP | 3128103 A1 | 2/2017 |
| FR | 2746426 A1 | 9/1997 |
| GB | 2214947 A | 9/1989 |
| JP | 4318258 B2 | 8/2009 |
| JP | 4574541 B1 | 11/2010 |
| JP | 4576221 B2 | 11/2010 |
| JP | 5042569 B | 10/2012 |
| JP | 5052161 B | 10/2012 |
| JP | 5489462 B2 | 5/2014 |
| JP | 5566522 B1 | 8/2014 |
| JP | 5743330 B2 | 7/2015 |
| JP | 6434901 B2 | 12/2018 |
| KR | 20040074631 | 8/2004 |
| WO | WO 82/03099 A1 | 9/1982 |
| WO | WO 86/02120 | 4/1986 |
| WO | WO 87/03324 A1 | 6/1987 |
| WO | WO 88/00997 A1 | 2/1988 |
| WO | WO 93/14286 A1 | 7/1993 |
| WO | WO 9522671 A1 | 8/1995 |
| WO | WO 99/54571 A | 10/1999 |
| WO | WO 99/55985 A1 | 11/1999 |
| WO | WO 2009/110934 A1 | 9/2009 |
| WO | WO 2015/161888 A1 | 10/2015 |

OTHER PUBLICATIONS

Exhibit B-2, "To Progress Profiles SP A's and Progress Profiles America's Response to Schluter Systems L.P's First Set ofInterrogatories," pursuant to *Imre Baton and Progress Profiles SPA* vs. *Schluter Systems L.P.*, Civil Action No. 1:15-cv-00144-CMH-IDD, presented Aug. 31, 2015, 10 pages.

Exhibit B-3, "To Progress Profiles SP A's and Progress Profiles America's Response to Schluter Systems L.P's First Set ofInterrogatories," pursuant to *Imre Baton and Progress Profiles SPA* vs. *Schluter Systems L.P.*, Civil Action No. 1:15-cv-00144-CMH-IDD, presented Aug. 31, 2015, 7 pages.

Exhibit B-4, "To Progress Profiles SP A's and Progress Profiles America's Response to Schluter Systems L.P's First Set ofInterrogatories," pursuant to *Imre Baton and Progress Profiles SPA* vs. *Schluter Systems L.P.*, Civil Action No. 1:15-cv-00144-CMH-IDD, presented Aug. 31, 2015, 7 pages.

\* cited by examiner

UNCOUPLING MAT WITH HEATING ELEMENTS

PRIORITY CLAIM

This application is a continuation of U.S. patent application Ser. No. 17/583,984, filed Jan. 25, 2022, which is a continuation of U.S. patent application Ser. No. 17/411,123, filed Aug. 25, 2021, which is a continuation of U.S. patent application Ser. No. 16/534,462, filed Aug. 7, 2019, which is a continuation of U.S. patent application Ser. No. 15/914,223, filed Mar. 7, 2018, and which claims priority of and to German Patent Application Serial No. 20 2017 101 349.9, filed Mar. 9, 2017, each of which is hereby incorporated herein by reference in its entirety for all purposes.

BACKGROUND OF THE INVENTION

Uncoupling mats are used to uncouple a substrate and a slab covering laid over the latter in terms of stress such that the transmission of stresses that develop in particular within the substrate to the slab covering is prevented. In this manner, the development of cracks in the slab covering or the detachment of individual tiles can be prevented.

BRIEF SUMMARY OF THE TECHNOLOGY

In accordance with one aspect of the technology, an uncoupling mat is provided that includes a flexible plastic layer (2) made of plastic film with structuring that defines indentations (6) provided with undercuts (5) on a first, top side (4) and cavities (8) positioned between the indentations (6) on an opposite second, bottom side (7). A fleece or fabric (3) can be securely connected to the bottom side (7) and covers the cavities (8). A cross-section of the indentations (6) in at least some corner regions (10) can increase from the bottom side (7) toward the top side (4).

In accordance with another aspect of the technology, an uncoupling mat (1) is provided including a flexible plastic layer (2) made of plastic film with structuring that defines indentations (6) provided with undercuts (5) on a first, top side (4) and cavities (8) positioned between the indentations (6) on an opposite second, bottom side (7). A fleece or fabric (3) can be securely connected to the bottom side (7) and covering the cavities (8). A cross-section of the indentations (6) in at least some corner regions (10) can increase constantly from the bottom side (7) toward the top side (4). A cross-section of the indentations (6) in center portions of the walls of the indentations beneath the undercuts can remain substantially constant, extending vertically straight from the bottom side (7) to the top side (4).

In accordance with another aspect of the technology, a slab covering installation is provided, including a substrate (14) and an uncoupling mat (1) fastened to the substrate (14) with a thin bed mortar (16). The uncoupling mat (1) can include a flexible plastic layer (2) made of plastic film with structuring that defines indentations (6) provided with undercuts (5) on a first, top side (4) and cavities (8) positioned between the indentations (6) on an opposite second, bottom side (7). A fleece or fabric (3) can be securely connected to the bottom side (7) and covering the cavities (8). A cross-section of the indentations (6) in at least some corner regions (10) can increase from the bottom side (7) toward the top side (4). A thin bed mortar (16) can be installed atop the uncoupling mat such that the thin bed mortar substantially fills the indentations (6) beneath the undercuts (5). A slab covering (15) can be fastened to the thin bed mortar atop the uncoupling mat.

BRIEF DESCRIPTION OF THE SEVERAL VIEWS OF THE DRAWINGS

Further features and advantages of the present invention become clear from the following description of embodiments of uncoupling mats according to the invention with reference to the attached drawings. These show as follows.

DETAILED DESCRIPTION OF THE INVENTION

Figure 1:
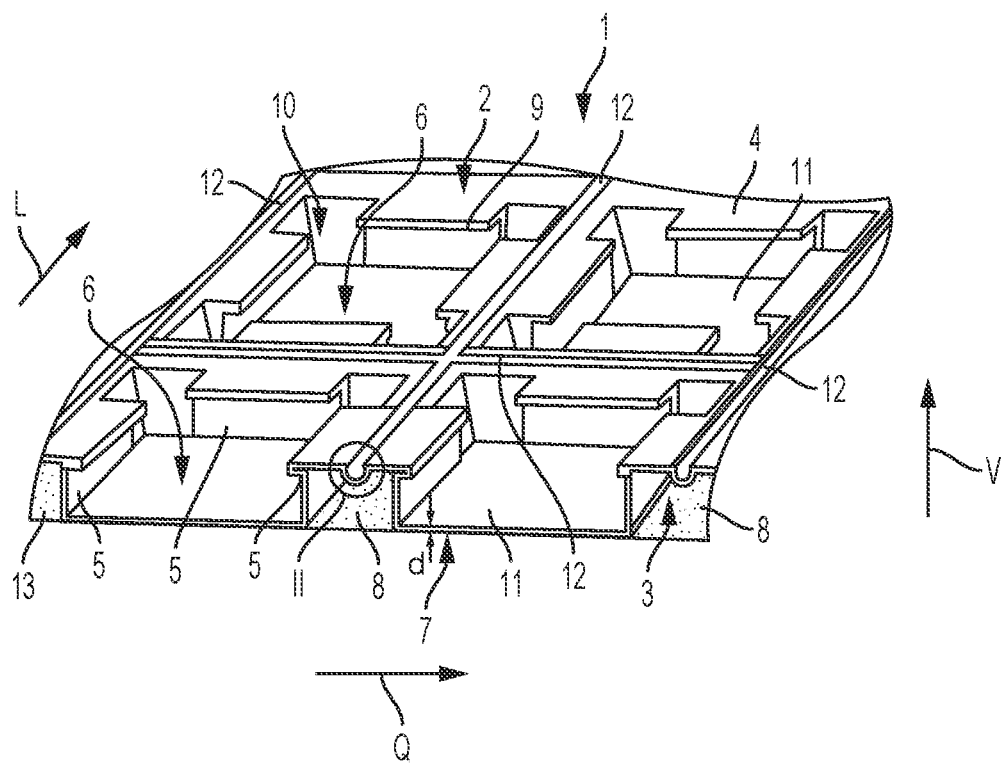
FIG. 1 a schematic perspective partial view of an uncoupling mat according to a first embodiment of the present invention.
Figure 2:
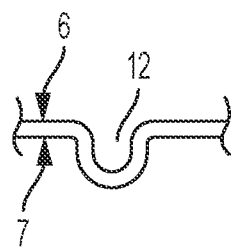
FIG. 2 an enlarged side view of the portion provided with reference sign II in FIG. 1 and which shows a weakening zone.
Figure 3:
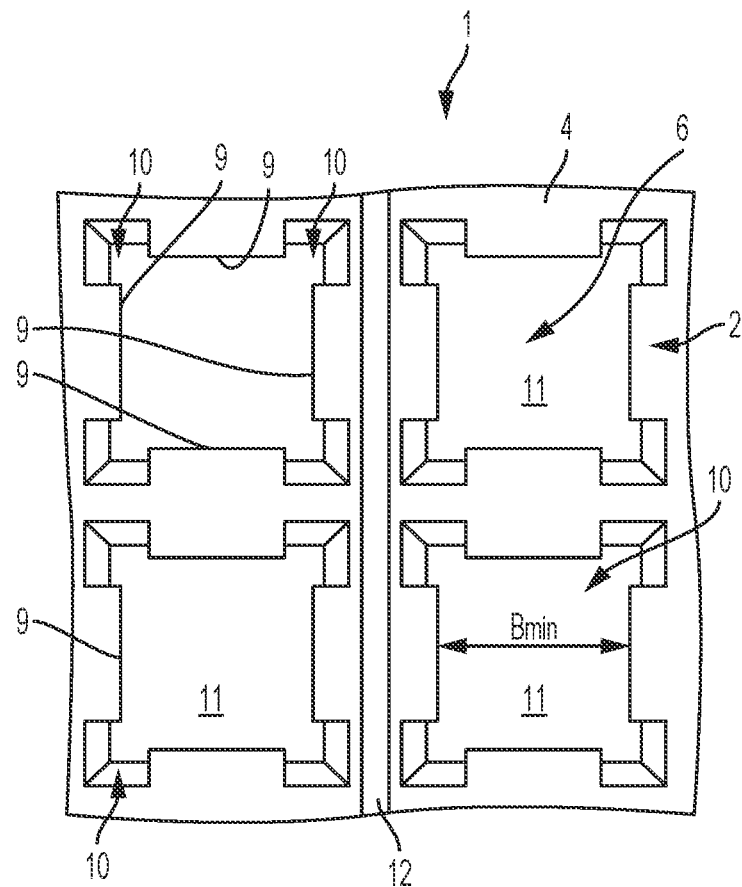
FIG. 3 a top view of the arrangement shown in FIG. 1.
Figure 4:
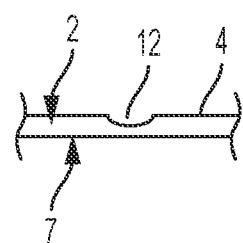
FIG. 4 a view similar to FIG. 2, which shows an alternative embodiment of a weakening zone.

The present invention relates generally to an uncoupling mat comprising a flexible plastic layer made of a film-like plastic with structuring that defines indentations provided with undercuts on the first side and cavities positioned between the indentations on the opposite second side, and a fleece or fabric securely connected to the second side and covering the cavities.

Uncoupling mats of the type specified are used to uncouple a substrate and a slab covering laid over the latter in terms of stress such that the transmission of stresses that develop in particular within the substrate to the slab covering is prevented. Thus, the development of cracks in the slab covering or the detachment of individual tiles can be prevented. For this purpose, in a first step uncoupling mats are normally fastened to the substrate using an adhesive that grips in the fleece or fabric. The adhesive can be, for example, a thin bed mortar, a reaction resin mortar or the like, reference only being made to thin bed mortar in the following for the sake of simplicity. In a further step the slab covering is then laid over the plastic layer of the uncoupling mat, once again using thin bed mortar, the thin bed mortar anchoring in the indentations provided with undercuts such as to form thin bed mortar stilts. In this way a secure connection between the substrate and the slab covering is achieved overall. Any stresses that are present within the substrate, caused for example by the remaining drying and curing process of the substrate, by the so-called settling of a construction, by temperature changes due to different thermal expansion coefficients of the materials used or the like, are then absorbed in the composite and compensated for by corresponding deformation of the uncoupling mats so that they cannot be transmitted to the slab covering. The freedom of movement of the uncoupling mat required for this is provided by the cavities formed on the second side of the plastic layer. Reference is made in this connection, for example, to the uncoupling mats described in publications DE 37 01 414 A1 and EP 1 073 813 B2, to the entire disclosure of which reference is herewith made.

DE 37 01 414 A1 describes an uncoupling mat, the plastic layer of which has concertina-like structuring, the indentations defined on the first side as well as the cavities defined on the second side being in the form of dovetails, and each extending parallel to one another. In this way, due to the structure, the freedom of movement of the uncoupling mat required for the uncoupling is provided substantially in a direction transverse to the direction of the extension of the cavities.

In contrast, on the basis of DE 37 01 414 A1, EP 1 073 813 B2 proposes an uncoupling mat with a plastic layer the structuring of which has cavities that cross in a grid on the second side and indentations provided with undercuts and delimited by the cavities on the first side. With this uncoupling mat therefore, use is not made of the uncoupling principle brought about by the concertina-like structuring of the plastic layer described in DE 37 01 414 A1. Rather, in the uncoupling mat described in EP 1 071 813, one relies upon the extensibility of the film-like plastic to achieve the uncoupling effect which allows movement of the thin bed mortar stilts formed in the indentations in the direction of the cavities with deformation of the plastic layer.

Fundamentally, it is desirable to further improve the uncoupling capability of known uncoupling mats.

Furthermore, it is desirable to improve the clamping of the lower side of known uncoupling mats which is formed by the fleece or the fabric with a thin bed mortar.

In addition, one disadvantage of known uncoupling mats is that upon filling the indentations with a thin bed mortar, the air can often not completely escape from the indentations, and so air inclusions develop which form uncontrolled cavities within the mortar, and this is not desirable.

On the basis of this prior art it is an object of the present invention to devise an uncoupling mat of the type specified at the start with an alternative structure.

In order to achieve this object, the present invention devises an uncoupling mat of the type specified at the start which is characterised in that the plastic layer is provided with a plurality of weakening zones which extend continuously between opposing side edges of the plastic layer. In other words, the present invention proposes further improving the uncoupling capability of an uncoupling mat of the type described in EP 1 073 813 B2 by the formation of additional weakening zones. By means of the weakening zones the plastic layer is given structurally an additional possibility for movement substantially transversely to the direction of extension, in particular in a straight line, of the weakening zones which is supplemented by the freedom of movement provided by the cavities, as a result of which an uncoupling mat with clearly improved uncoupling capability is provided overall.

The weakening zones are preferably provided in the form of grooves, the grooves possibly having, for example, a semi-circular, semi-elliptical or a V-shaped or triangular cross-section. In this way the uncoupling mat according to the invention can be produced with a simple structure.

According to one embodiment of the present invention the plastic layer has a substantially constant thickness, the thickness being smaller in the region of the weakening zones. In this way, targeted weakening of the plastic layer is therefore brought about not only structurally, but also by a smaller thickness of the plastic layer in the region of the weakening zones.

Preferably, a first group of weakening zones extending parallel to one another is provided, which weakening zones extend in particular transversely to a longitudinal direction of the uncoupling mat, for example perpendicular to the longitudinal direction. If the uncoupling mat is formed longitudinally, i.e. rectangularly as viewed from above, with a shorter and a longer side edge, the longitudinal direction advantageously corresponds to the direction of extension of the longer side edge. In this way additional uncoupling is provided which compensates for stresses acting in particular substantially perpendicularly to the direction of extension of the first group of weakening zones.

Advantageously, a second group of weakening zones extending parallel to one another is provided which crosses the first group, in particular at a right angle. Accordingly, a further additional uncoupling effect is provided which in particular compensates for stresses acting substantially perpendicular to the direction of the extension of the second group of weakening zones. It should be clear that more than two groups of weakening zones extending parallel to one another, and which cross one another, may also be provided.

Advantageously, the weakening zones are arranged spaced apart from one another equally, the distances preferably being in the range of from 10 to 100 mm, in particular in the range of from 10 to 50 mm. It has been shown that these distances have a good uncoupling effect within the ranges specified.

Advantageously, the weakening zones each extend between two rows of indentations, i.e. not through the indentations themselves. Weakening zones can be formed here between each row of indentations. Alternatively however, it is also possible to provide weakening zones, for example, only between every second or third row of indentations.

In order to achieve the object specified at the start, the present invention furthermore devises an uncoupling mat of the type specified at the start which is characterised in that the fleece or fabric has through holes with a cross-section in the range of from 0.5 to 1.0 mm$^2$, in particular in the range of from 0.5 of 0.8 mm$^2$. Such small through holes with a cross-section within said range are characterised in that they allow the passage of thin bed mortar in the conventionally used consistency with the normal manual contact pressure of the uncoupling mats that is involved when they are being laid, whereupon the thin bed mortar can not only grip to the fleece or the fabric, but also behind the latter, clogging of the cavities that are essential for the uncoupling effect with thin bed mortar being reliably avoided however.

Furthermore, the present invention devises an uncoupling mat of the type specified at the start which is characterised in that the indentations have corner regions, the cross-section of the indentations in at least some corner regions increasing towards the first side, in particular constantly increasing, preferably from the bottom of the corresponding indentation. Corner regions configured in this way lead to air being able to escape well while thin bed mortar is being applied to the first side of the plastic layer of the uncoupling mat with an appropriate trowel, as a result of which air inclusions and the formation of uncontrolled cavities associated with the latter are able to be prevented, and good and consistent filling of the indentations with thin bed mortar can be accomplished.

According to a first version of the uncoupling mat according to the invention the cavities cross one another and define a grid- or net-like arrangement. In this way almost consistent and good uncoupling can be accomplished in all or nearly all directions.

Advantageously, the uncoupling mat in this version has 100 to 3000 indentations per square metre, as a result of which the uncoupling function is also optimised.

According to a second version of the uncoupling mat according to the invention the indentations cross one another and define a grid- or net-like arrangement.

In this second version the uncoupling mat preferably has 100 to 3000 cavities per square metre, as a result of which the uncoupling function is optimised.

In the second version the cavities can at least partially have an annular cross-section. This means that additional recesses are formed on the opposite side, as a result of which the bearing capacity of an arrangement produced with the uncoupling mat is improved.

According to one embodiment of the present invention the indentations have a minimum width in the range of from 3 to 20 mm and a maximum height in the range of from 2 to 20 mm.

Turning now the figures, FIGS. 1 to 5 show an uncoupling mat 1 according to an embodiment of the present invention which has, as main components, a plastic layer 2 and a fleece or fabric 3, and which can be provided in a sheet or a roll.

The plastic layer 2 is produced from film-like plastic and has a substantially consistent thickness d which is normally in the range between 0.4 and 1.0 mm. Accordingly, the plastic layer 2 is extensible, i.e. it can be deformed manually. The plastic layer 2 is provided with structuring which on a first side 4, which in the correctly laid state of the uncoupling mat 1 forms the upper side, defines indentations 6 provided with undercuts 5, and on the opposite second side 7 defines cavities 8 arranged between the indentations 6, which cavities in the present case cross one another and form a grid-like arrangement. The indentations 6 provided in a regular arrangement preferably have a minimum width $B_{min}$ in the range of from 3 to 20 mm and a maximum height $H_{max}$ in the range of from 2 to 8 mm, their number being in particular 500 to 3000 per square metre. In this case the indentations 6 are substantially cuboid in form, the undercuts 5 each being formed by a projection 9 which projects into the indentation 6. However, it should be clear that the indentations 6 may also differ from the cuboid form, for example, as seen from above, they may also be hexagonal or octagonal, cross-shaped or circular in form. Likewise, the shape and number of the projections 9, and accordingly also of the undercuts 5 formed by the latter, may vary. Thus, the side walls which delimit the indentations 6 laterally may also simply have a corresponding incline to the vertical V (direction perpendicular to the bottom 11) in order to form the undercuts 5. The cross-section of the indentations 6 increases constantly in the corner regions 10 from the bottom 11 towards the first side 4. In the present case this is achieved by the inner edges defining the corner regions 10 being inclined accordingly with respect to the vertical V. A plurality of weakening zones 12 extend between the indentations 6, which weakening zones extend continuously and preferably in a straight line between opposing side edges of the plastic layer 2, in the present case perpendicular to the latter and parallel to one another. The weakening zones 12 are provided as grooves with a substantially semi-circular cross-section. Basically, however, the grooves may also have a cross-sectional form that differs from this, such as for example the form of a semi-ellipse, a triangle or the like. In the embodiment of the weakening zones 12 shown in FIG. 2, the thickness d is constant in relation to the thickness d of the other plastic layer 2. However, it may also be smaller, as shown by way of example in FIG. 4, as a result of which an additional weakening effect is achieved. The weakening zones 12 are spaced apart equally from one another, the distances preferably being in the range of from 10 to 100 mm, in particular in the range of from 10 to 50 mm. The weakening zones 12 may be formed here between each row of indentations 6. Alternatively however, they may also be provided only between every second or third row of indentations 6, to give just one example. The distances between the parallel weakening zones 12 in the longitudinal direction L and the transverse direction Q of the uncoupling mat 1 may also be different. Moreover, weakening zones 12 may also be formed only transversely to the longitudinal direction L or only transversely to the transverse direction Q.

The fleece or fabric 3 is connected securely to the second side 7 of the plastic layer 2 and accordingly covers the cavities 8 thereof. Thus, the fleece or fabric 3 may be laminated onto the second side 7 of the plastic layer 2, for example, or be adhered to the latter. The fleece or fabric 3 comprises regularly arranged through holes 13 with a cross-section in the range of from 0.5 to 1.0 $mm^2$, in particular in the range of from 0.5 to 0.8 $mm^2$.

Figure 5:
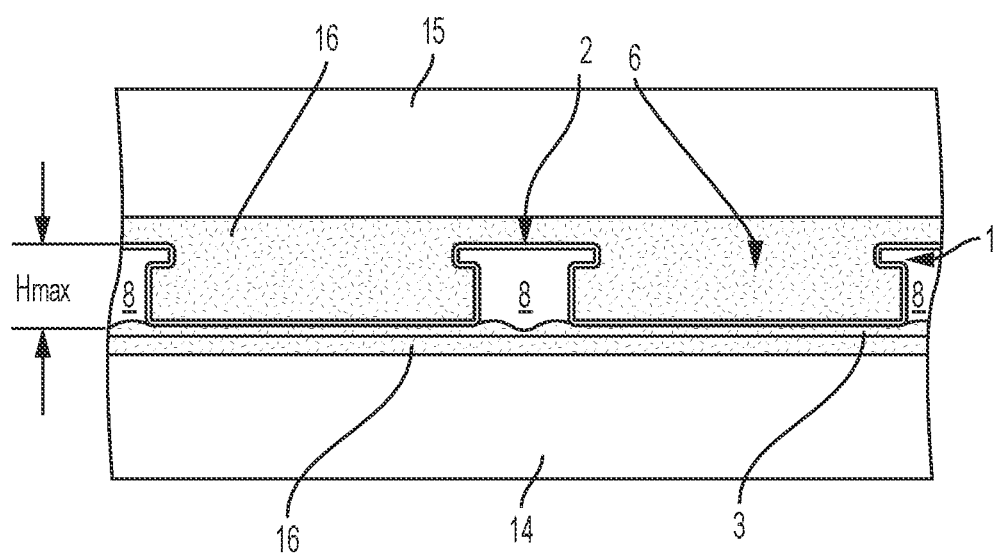
FIG. 5 a side view of the arrangement shown in FIG. 1 in the correctly laid state.

The uncoupling mat 1 serves to uncouple a substrate 14 and a slab covering 15 laid over the latter in terms of stress. In a first step, as shown in FIG. 5, it is fastened to the substrate 14 using a thin bed mortar 16. The thin bed mortar 16 is mostly applied to the substrate 14 here using a trowel and/or a toothed trowel, whereupon the uncoupling mat 1 is positioned and pressed onto the substrate. At this juncture the thin bed mortar grips in the fleece or fabric 3, as a result of which a first fixing is brought about. A fleece is advantageous in that it consists of a plurality of small individual threads which also project outwards, as a result of which a profound connection to the thin bed mortar 16 is achieved. In the case of a fabric, this should also have projecting individual threads in the manner of a fleece so as to also bring about the appropriate effect. By virtue of the chosen cross-section of the through holes 13, the latter are sufficiently large for the thin bed mortar 16 to penetrate the fleece or fabric 3 slightly, as a result of which further fixing is achieved by the anchoring of the thin bed mortar 16 behind the fleece or fabric 3, but they are also sufficiently small, and this reliably prevents the cavities 8 of the uncoupling mat 1 from completely clogging with thin bed mortar 16.

In a second step the slab covering 15, for example in the form of tiles, is then laid over the plastic layer 2 of the uncoupling mat 1, once again using thin bed mortar 16, the thin bed mortar 16 anchoring in the indentations 6 provided with undercuts 5. When distributing the thin bed mortar 16 over the plastic layer 2 with a trowel and/or a toothed trowel, it is ensured by virtue of the design of the corner regions 10 of the indentations 6 that any air that is present in the indentations 6 can escape without any problem, as a result of which the formation of cavities between the uncoupling mat 1 and the slab covering 15 is suppressed, and complete or nearly complete filling of the indentations 6 with thin bed mortar 16 can also be better accomplished.

If stresses now occur in the substrate 14, caused for example by the remaining drying and curing process of the substrate 14, by the so-called settling of a construction, by temperature changes due to different thermal expansion coefficients of the materials used or the like, these stresses are thus absorbed and compensated for by corresponding deformation of the uncoupling mat 1 so that they cannot be transmitted to the slab covering 15. The freedom of movement of the uncoupling mat 1 required for this is on the one hand provided by the cavities 8 formed on the second side 7 of the plastic layer 2, which cavities allow movement of the thin bed mortar stilts formed in the indentations 6 in the direction of the cavities 8. On the other hand, the weakening zones 12 enable expansion and/or compression of the plastic layer, in each case respectively perpendicular to the direction of extension of the weakening zones 12, as a result of which additional uncoupling is provided.

Figure 6:
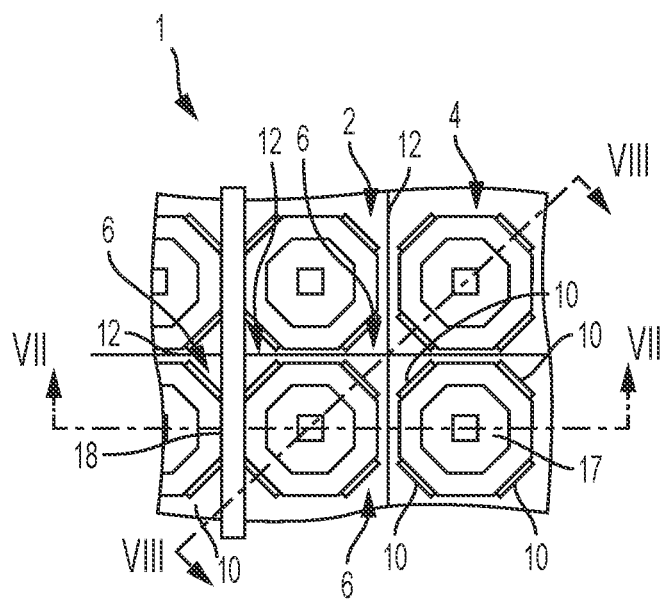
FIG. 6 a schematic top view of an uncoupling mat according to a second embodiment of the present invention.
Figure 7:
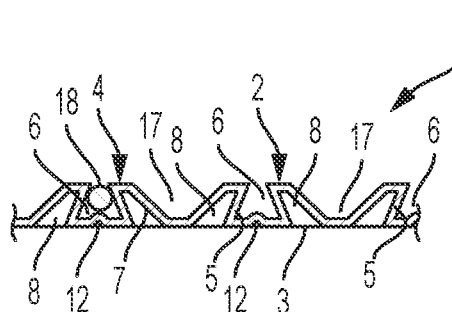
FIG. 7 a cross-sectional view along line VII-VII in FIG. 6.
Figure 8:
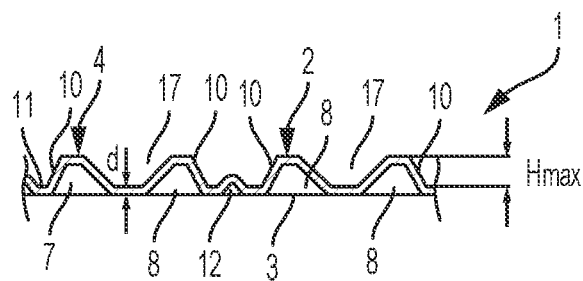
FIG. 8 a cross-sectional view along line VIII-VIII in FIG. 6.

FIGS. 6 to 8 show an uncoupling mat 1 according to a second embodiment of the present invention which also has, as main components, a plastic layer 2 and a fleece or fabric 3. The uncoupling mat 1 according to the second embodiment only differs from the previously described embodiment with regard to the structuring of the plastic layer 2. In the present case the structuring defines on the first side 4, which in the correctly laid state of the uncoupling mat 1 forms the upper side, indentations 6 provided with undercuts 5, which indentations are made in the form of channels and form a grid-like arrangement. On the opposite second side 7 the structuring defines cavities 8 arranged between the indentations 6, which cavities in this case are in an octagonal annular form so that a recess 17 develops in the middle of an annular cavity 8 on the first side 4. The indentations 6 have a cross-section which is adapted to the diameter of a cable 18, in particular a heating cable, such that the cable 18 can be held, clamped in the indentations 6, as shown by way of example in FIGS. 6 and 7. The weakening zones 12 extend in the middle of the indentations 6 in the longitudinal and transverse direction of the uncoupling mat 1, which weakening zones in the present case are formed similarly to the weakening zone 12 shown in FIG. 2, only that they are curved upwards and not downwards. It should be pointed out that the form of the indentations 6 and cavities 8 may vary. Thus, the cavities may also have a form that differs from an octagonal annular form, to give just one example.

It should be clear that the embodiments described above only serve as examples, and they are in no way to be understood to be restrictive. In fact, changes and/or modifications are possible, without straying from the scope of protection of the present application which is defined by the attached claims. In particular, individual features of the embodiments that are described may be substituted.

LIST OF REFERENCE SIGNS 1 uncoupling mat
2 plastic layer
3 fleece/fabric
4 first side
5 undercut
6 indentation
7 second side
8 cavity
9 projection
10 corner region
11 bottom
12 weakening zone
13 through hole
14 substrate
15 slab covering
16 thin bed mortar
17 recess
18 cable
$B_{min}$ minimum width
$H_{max}$ maximum height
d thickness
V vertical
L longitudinal direction
Q transverse direction

I claim:

1. A slab covering installation, comprising:
 a substrate (14);
 an uncoupling mat (1) fastened to the substrate (14) with a thin bed mortar (16), the uncoupling mat (1) comprising:
  a flexible plastic layer (2) made of plastic film with structuring that defines indentations (6) provided with undercuts (5) on a first, top side (4) and cavities (8) positioned between the indentations (6) on an opposite second, bottom side (7), and
  a fleece or fabric (3) securely connected to the bottom side (7) and covering the cavities (8), wherein:
  a cross-section of the indentations (6) in at least some corner regions (10) increases from the bottom side (7) toward the top side (4);
 a thin bed mortar (16) installed atop the uncoupling mat such that the thin bed mortar substantially fills the indentations (6) beneath the undercuts (5); and
 a slab covering (15) fastened to the thin bed mortar atop the uncoupling mat.

2. The uncoupling mat (1) of claim 1, wherein the cross-section of the indentations (6) in at least some corner regions (10) increases constantly towards the top side (4) from the bottom side (7).

3. The installation of claim 1, wherein a cross-section of the indentations (6) adjacent center portions of the walls of the indentations beneath the undercuts remains substantially constant from the bottom side (7) to the top side (4).

4. The installation of claim 1, wherein the center portions of the walls beneath the undercuts extend vertically straight downwardly from beneath the undercuts.

5. The installation of claim 1, wherein the plastic layer (2) is provided with a plurality of weakening zones (12) which extend continuously between opposing side edges of the plastic layer (2).

6. The installation of claim 5, wherein in the weakening zones (12) comprise grooves.

7. The installation of claim 5, wherein the plastic layer (2) has a substantially constant thickness (d), the thickness (d) being smaller in the region of the weakening zones (12).

8. The installation of claim 5, wherein at least some of a first group of weakening zones (12) extend parallel to one another, said parallel weakening zones extending transversely to a longitudinal direction of the uncoupling mat (1).

9. The installation of claim 8, wherein at least some of a second group of weakening zones (12) extend parallel to one another, the second group of parallel weakening zones crossing the first group of parallel weakening zones at right angles.

* * * * *